(12) United States Patent
Sirbasku et al.

(10) Patent No.: US 11,894,729 B2
(45) Date of Patent: Feb. 6, 2024

(54) ALTERNATING CURRENT CONNECTION HOUSING WITH INTEGRATED INSERTS

(71) Applicant: Hamilton Sundstrand Corporation, Charlotte, NC (US)

(72) Inventors: Kyle S. Sirbasku, Rockford, IL (US); Dhaval Patel, Schaumburg, IL (US); Edward C. Allen, Davis, IL (US); Mary Christelle Ann Calacal, Rockford, IL (US); Andrew R. Wilkinson, Cherry Valley, IL (US); Duane C. Johnson, Beloit, WI (US); Yaser J. Isa, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 131 days.

(21) Appl. No.: 17/200,821

(22) Filed: Mar. 13, 2021

(65) Prior Publication Data

US 2022/0294314 A1 Sep. 15, 2022

(51) Int. Cl.
| | | |
|---|---|---|
| *H02K 11/042* | (2016.01) | |
| *H01R 13/11* | (2006.01) | |
| *H01R 13/42* | (2006.01) | |
| *H02K 19/38* | (2006.01) | |
| *H02G 5/00* | (2006.01) | |

(52) U.S. Cl.
CPC ........... *H02K 11/042* (2013.01); *H01R 13/11* (2013.01); *H01R 13/42* (2013.01); *H02K 19/38* (2013.01); *H02G 5/00* (2013.01)

(58) Field of Classification Search
CPC ........ H02K 11/042; H02K 19/38; H02G 5/00; H01R 13/40; H01R 13/02; H01R 13/11; H01R 13/42
See application file for complete search history.

(56) References Cited

U.S. PATENT DOCUMENTS

| | | | | |
|---|---|---|---|---|
| 2,243,573 | A * | 5/1941 | Murphy | H01R 13/66 439/465 |
| 2,922,054 | A * | 1/1960 | Miller | H01R 29/00 310/71 |
| 4,090,759 | A * | 5/1978 | Herrmann, Jr. | H01R 13/53 439/279 |
| 4,329,603 | A | 5/1982 | Ballard | |
| 4,707,045 | A * | 11/1987 | Ney | H01R 13/5221 439/942 |
| 4,886,463 | A * | 12/1989 | Scott | H01R 13/6583 439/272 |
| 4,904,198 | A * | 2/1990 | Begitschke | H01R 13/53 439/184 |

(Continued)

OTHER PUBLICATIONS

Extended European Search Report for European Patent Application No. EP22161918.2, dated Sep. 5, 2022.

*Primary Examiner* — Harshad C Patel
(74) *Attorney, Agent, or Firm* — Locke Lord LLP; Joshua L. Jones; Gabrielle L. Gelozin

(57) ABSTRACT

An assembly comprises an AC (alternating current) housing connection block and a plurality of inserts seated in the AC housing connection block, wherein for each of the inserts, an interface between the insert and the housing is continuous. A method includes inserting a plurality of inserts into a mold; and molding an AC (alternating current) housing connection block.

17 Claims, 3 Drawing Sheets

(56) References Cited

U.S. PATENT DOCUMENTS

| | | | |
|---|---|---|---|
| 5,017,821 A * | 5/1991 | Shervington | H02K 11/042 310/71 |
| 5,154,638 A * | 10/1992 | Sireul | H05G 1/08 439/611 |
| 5,274,292 A | 12/1993 | Lemmer et al. | |
| 5,354,221 A * | 10/1994 | Doherty, II | H01R 33/7621 439/683 |
| 5,408,154 A * | 4/1995 | Meiser | B25J 17/0241 439/577 |
| 5,415,564 A * | 5/1995 | Winter | H02G 3/00 439/535 |
| 5,474,472 A * | 12/1995 | Niwa | H01R 13/6585 439/108 |
| 5,511,990 A * | 4/1996 | Klemen | H01R 13/748 439/559 |
| 5,626,486 A * | 5/1997 | Shelly | H01R 13/53 439/273 |
| 5,860,681 A * | 1/1999 | Slais | F16L 41/086 285/137.11 |
| 5,885,102 A * | 3/1999 | Harting | H02K 5/225 439/527 |
| 6,027,349 A * | 2/2000 | Chang | H01R 13/648 439/101 |
| 6,669,506 B2 * | 12/2003 | Newton | B60T 13/665 439/564 |
| 7,377,808 B2 * | 5/2008 | Gentry | H01R 13/521 439/578 |
| 7,544,080 B2 * | 6/2009 | Giefers | H01R 13/633 439/352 |
| 7,572,150 B2 * | 8/2009 | Matsuoka | H01R 13/4223 439/626 |
| 8,029,324 B1 * | 10/2011 | Yi | H01R 13/518 439/745 |
| 8,545,265 B2 * | 10/2013 | Sakamoto | H01R 13/504 439/606 |
| 9,160,207 B2 * | 10/2015 | Zeng | H02K 5/24 |
| 9,306,313 B2 * | 4/2016 | Heggemann | H01R 13/40 |
| 9,865,944 B2 * | 1/2018 | Chen | H01R 9/18 |
| 9,935,394 B2 * | 4/2018 | Williams | H01R 13/533 |
| 10,897,105 B2 * | 1/2021 | Iizuka | H01R 13/533 |
| 10,987,105 B2 * | 4/2021 | Cappola | A61B 17/068 |
| 11,336,047 B2 * | 5/2022 | Kliever | H01R 13/4364 |
| 2005/0241919 A1 * | 11/2005 | Peterson, Jr. | B65G 25/065 198/750.2 |
| 2008/0139030 A1 * | 6/2008 | Milo | H01R 13/745 439/277 |
| 2010/0207446 A1 * | 8/2010 | Tandler | B60T 8/368 303/10 |
| 2011/0092094 A1 * | 4/2011 | Rueggen | H02S 40/34 439/540.1 |
| 2011/0235977 A1 * | 9/2011 | Yamada | H01R 24/84 385/76 |
| 2011/0266899 A1 | 11/2011 | Patel et al. | |
| 2012/0100737 A1 * | 4/2012 | Frey | H01R 43/005 439/271 |
| 2013/0251549 A1 * | 9/2013 | Rogalski | F04C 23/008 417/313 |
| 2014/0319943 A1 * | 10/2014 | Angermeier | H02K 19/38 310/71 |
| 2021/0078419 A1 * | 3/2021 | Lyon | G01K 1/14 |

\* cited by examiner

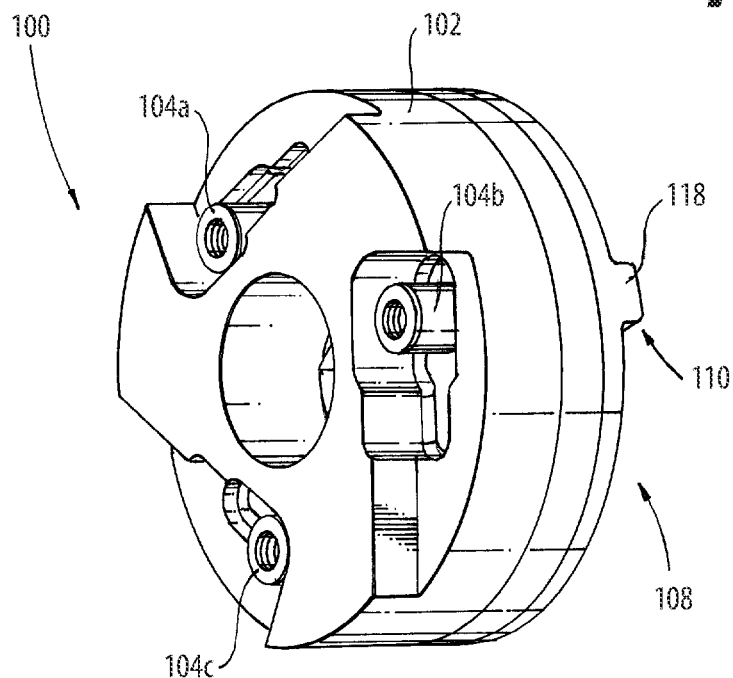
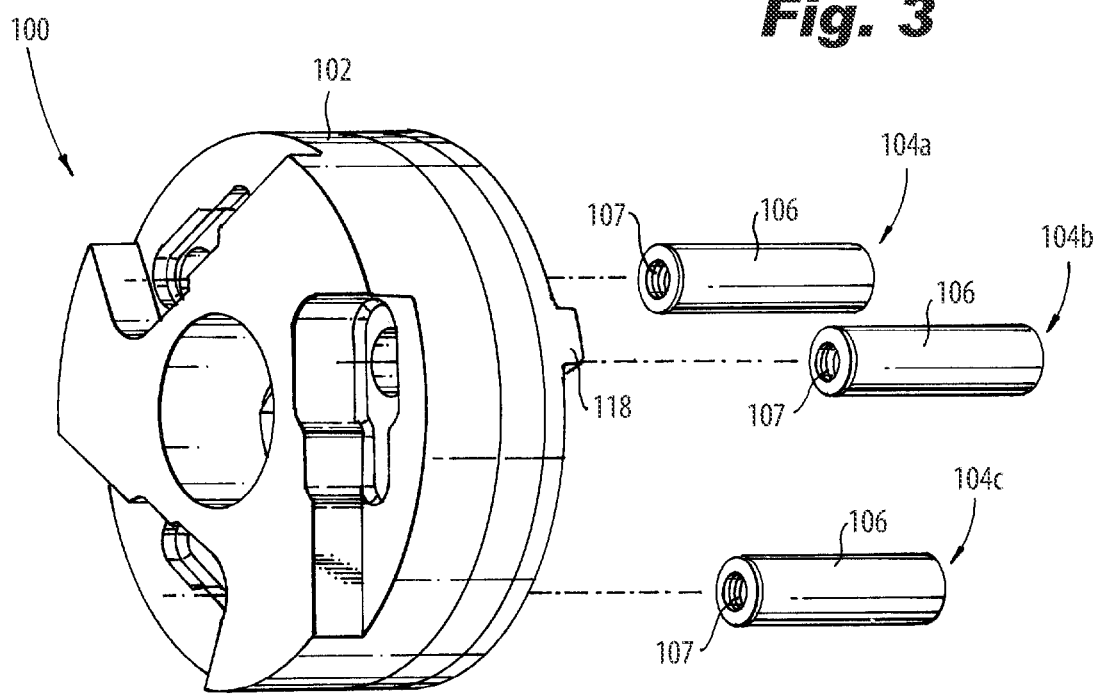

ALTERNATING CURRENT CONNECTION HOUSING WITH INTEGRATED INSERTS

BACKGROUND

1. Field

The present disclosure relates generally to electrical machines and more particularly to alternating current (AC) housings for rotating rectifier assemblies for generators.

2. Description of Related Art

Some rotating rectifier assemblies utilizes a multi-piece AC (alternating current) housing connection block as the interface between the exciter armature and the rotating rectifier assembly. Prior to this disclosure, existing designs require the use of three threaded inserts, three preformed packings (o-rings), and a plastic housing component.

The conventional techniques have been considered satisfactory for their intended purpose. However, there is an ever present need for improved systems and methods for more efficient AC housing connections. This disclosure provides a solution for this need.

SUMMARY

An assembly comprises an AC (alternating current) housing connection block and a plurality of inserts seated in the AC housing connection block, wherein for each of the inserts, an interface between the insert and the housing is continuous. The interface between each insert can define a cylindrical surface. The interface can be devoid of any seal ring sealing between the insert and the AC housing connection block.

Each of the inserts can be threaded internally for receiving a connector to electrically connect the AC housing connection block to a rectifier. The inserts can be entirely of brass and the AC housing connection block can be entirely of a polymer material. Both the AC housing connection block and the inserts can be entirely free of Beryllium Copper (BeCu).

Each of the inserts can be mirror-image symmetrical with itself in an axial direction. One end of the AC housing connection block can define an alignment feature configured to ensure mating components are properly aligned for cooling flow. The AC housing connection block can be electrically connected to a rectifier in a brushless generator.

A method comprises inserting a plurality of inserts into a mold, and molding an AC (alternating current) housing connection block. The method can include machining threads into each of the inserts. The method can include aligning the AC housing connection block with a rectifier assembly and installing the AC housing connection block into the rectifier assembly. Aligning the AC housing connection block can include aligning an alignment feature of the AC housing connection block with a respective feature of the rectifier assembly.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 2 is a schematic perspective view of the AC connection housing block of FIG. 1

FIG. 3 is a schematic exploded view of the AC connection housing block of FIG. 2.

DETAILED DESCRIPTION

Figure 1:
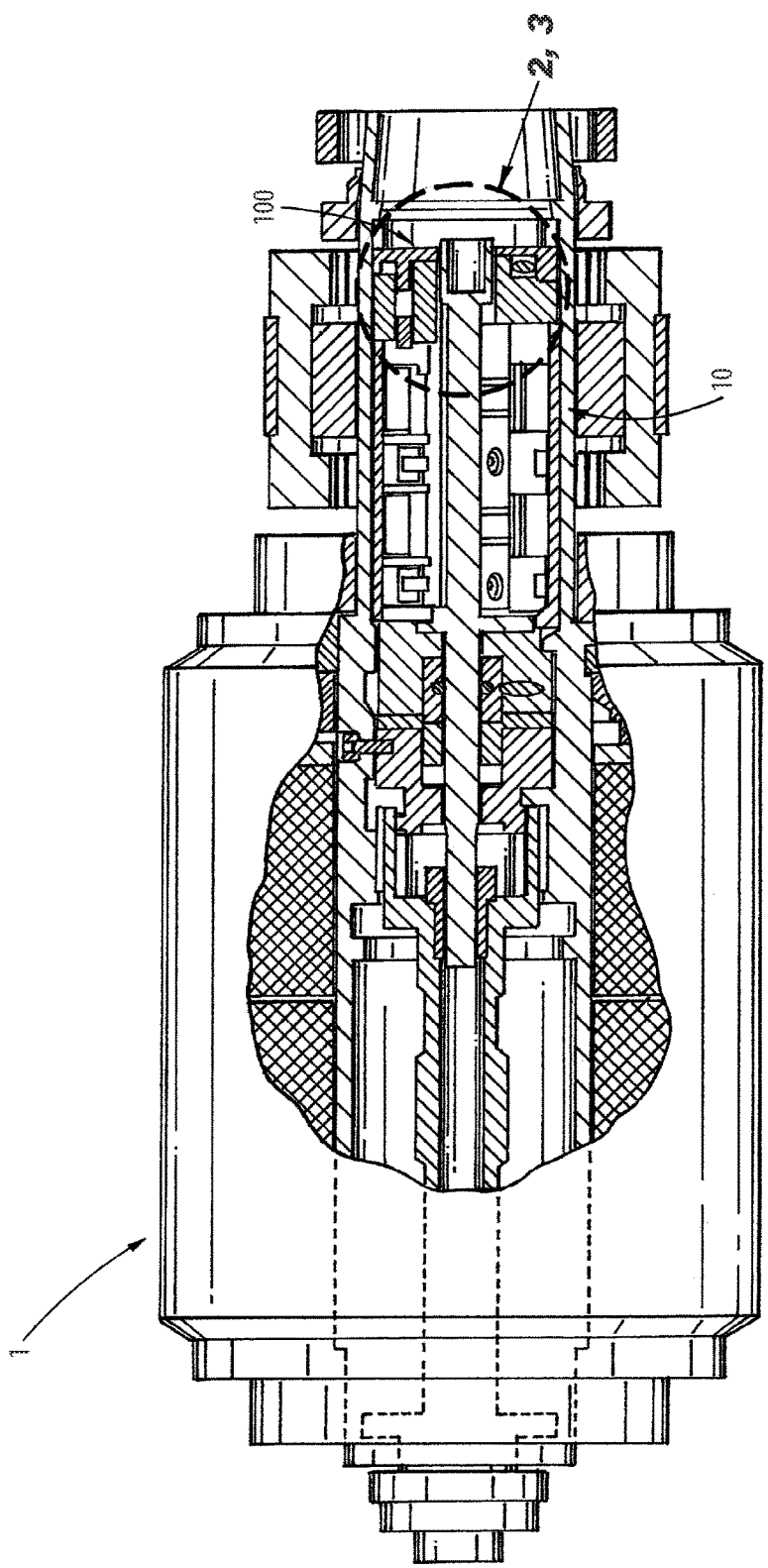
FIG. 1 is a schematic cross sectional view of an embodiment of a generator constructed in accordance with the present disclosure, showing the location of an AC connection housing block.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to form an AC connection housing having increased dielectric strength and creepage distance.

Shown in FIG. 1, a generator 1 (e.g. a brushless and/or variable frequency generator) can include a rectifier 10 (e.g. a rotating rectifier assembly) and an alternating current (AC) housing assembly 100, where the AC housing connection block 102 can be electrically connected to the rectifier 10 in the generator 1.

Referring now to FIGS. 2-3 the assembly 100 can comprise an AC housing connection block 102 and a plurality of inserts 104*a,b,c* seated in the AC housing connection block 102. For each of the inserts 104*a,b,c*, an interface 106 between the insert 104 and the housing 102 can be continuous. For example, the interface 106 defines a cylindrical surface (e.g. a knurled surface for additional grip, ensure the plastic bites into the surface and holds the insert in place) and can be devoid of any seal ring sealing between the insert 104 and the AC housing connection block 102.

In embodiments, each of the inserts 104*a,b,c* can be threaded (e.g. threads 107) internally for receiving a respective connector to electrically connect the AC housing connection block 102 to the rectifier assembly 10. The inserts 104*a,b,c* can be entirely of brass and the AC housing connection block 102 can be entirely of a polymer material. Both the AC housing connection block 102 and the inserts 104*a,b,c* can be entirely free of Beryllium Copper (BeCu). BeCu is classified as a dangerous material for machining, therefore machining conventional inserts made of BeCu required compliance with health and safety regulations. Elimination of BeCu from the assembly 100 removes the additional compliance requirements, as well as provides for a safer manufacturing environment.

Each of the inserts 104*a,b,c* can be mirror-image symmetrical with itself in an axial direction, across axis A. One end 108 of the AC housing 102 connection block can define at least one alignment feature 110 configured to ensure mating components are properly aligned for cooling flow. For example, the housing 102 can include protrusion 118 configured to engage a corresponding recess (not shown) in rectifier assembly 10.

Figure 4:
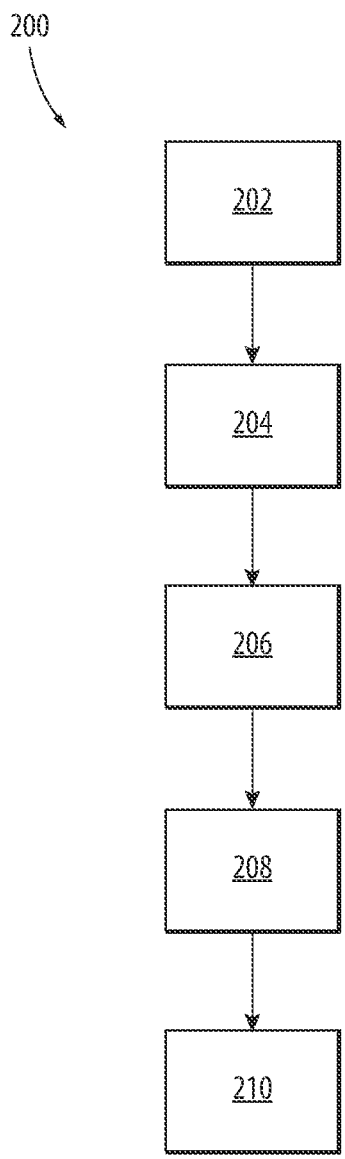
FIG. 4 is a schematic box diagram of a method in accordance with at least one aspect of this disclosure.

Shown in FIG. 4, a method 200 can include installing 202 a plurality of inserts 104a,b,c into a mold, and molding 204 an AC (alternating current) housing connection block 102 around the plurality of inserts 104a,b,c. The method 200 can further comprise machining 206 threads 107 into each of the inserts 104a,b,c. The method can also include orienting threading in each of the inserts within the housing prior to connecting other parts to the AC housing connection block. The method 200 can further include aligning 210 the alignment feature 118 of the AC housing connection block 102 with a corresponding recess in the rectifier assembly 10, and installing the housing 102 into a rectifier assembly 10.

The methods and systems of the present disclosure, as described above and shown in the drawings, provide for decreased complexity in assembly, reduced manufacturing cost and compliance requirements, eliminates the need for preformed packings (reducing leakage paths) and increased dielectric strength and creepage distance. While the apparatus and methods of the subject disclosure have been shown and described, those skilled in the art will readily appreciate that changes and/or modifications may be made thereto without departing from the scope of the subject disclosure.

What is claimed is:

1. An assembly comprising:
    an AC (alternating current) housing connection block; and
    a plurality of inserts seated in the AC housing connection block, wherein an interface between each insert and the AC housing connection block is continuous, wherein the AC housing connection block is disposed over the plurality of inserts, wherein each of the inserts is threaded internally for receiving a respective connector to electrically connect the AC housing connection block to a rectifier, wherein each of the inserts is mirror-image symmetrical with itself such that a first end of each insert is internally threaded for receiving a first connector to electrically connect the AC housing connection block to the rectifier and a second end of each insert is internally threaded for receiving a second connector to electrically connect the AC housing connection block to the rectifier.

2. The assembly as recited in claim 1, wherein the interface between each insert defines a cylindrical surface.

3. The assembly as recited in claim 1, wherein the interface is devoid of any seal ring sealing between the insert and the AC housing connection block.

4. The assembly as recited in claim 1, wherein the inserts are entirely of brass.

5. The assembly as recited in claim 1, wherein the AC housing connection block is entirely of a polymer material.

6. The assembly as recited in claim 1, wherein the AC housing connection block and inserts are entirely free of Beryllium Copper (BeCu).

7. The assembly as recited in claim 1, wherein one end of the AC housing connection block defines an alignment feature configured to ensure mating components are properly aligned for cooling flow.

8. The assembly as recited in claim 7, wherein the AC housing connection block is electrically connected to a rectifier in a brushless generator.

9. The assembly as recited in claim 1, wherein the AC housing connection block is molded over the plurality of inserts.

10. The assembly as recited in claim 9, wherein the interface between each insert and the AC housing connection block is conformal to each insert.

11. The assembly as recited in claim 1, wherein the interface between each insert and the AC housing connection block includes a knurled surface configured to hold the insert in place within the AC housing connection block.

12. An assembly comprising:
    an AC (alternating current) housing connection block defining a central axis and including a central bore configured to provide a cooling flow to a rectifier assembly, wherein one end of the AC housing connection block defines an alignment protrusion configured to mate with a recess within the rectifier assembly to align a cooling flow path through the central bore with one or more cooling flow paths within the rectifier assembly; and
    a plurality of inserts seated in the AC housing connection block arranged circumferentially about the central bore, wherein an interface between each insert and the AC housing connection block is continuous in the axial direction.

13. The assembly of claim 12, wherein the alignment protrusion is integrally formed with the AC housing connection block.

14. The assembly as recited in claim 12, wherein each of the inserts is threaded internally at a first end and a second end opposite the first end, wherein the first end of each insert is configured to receive a first respective threaded connector therein to electrically connect the AC housing connection block to the rectifier, and wherein the second end of each insert is configured to receive a second respective threaded connector therein, separate from the first connector, to electrically connect the AC housing connection block to the rectifier.

15. The assembly as recited in claim 14, wherein the first end of each insert is a mirror-image with the second end of each insert.

16. The assembly as recited in claim 14, wherein the AC housing connection block is entirely of a polymer material, and wherein polymer material is molded over the plurality of inserts to form the AC housing connection block such that an interface between each insert and the AC housing connection block is conformal to each insert and continuous along each insert.

17. The assembly as recited in claim 16, wherein the interface between each insert and the AC housing connection block includes a knurled surface configured to hold each insert in place within the AC housing connection block.

* * * * *